Patented Mar. 31, 1953

2,633,444

UNITED STATES PATENT OFFICE 2,633,444

ALKALI METAL NITRITE AND AMMONIUM SALT OF AN INORGANIC ACID GAS GENERATING COMPOSITION CONTAINING A VAPORIZABLE PESTICIDE

Douglas J. B. Marke, West Kilbride, Scotland, assignor to Imperial Chemical Industries Limited, a corporation of Great Britain No Drawing. Application December 5, 1949, Serial No. 131,247. In Great Britain January 5, 1949

8 Claims. (Cl. 167—40)

The present invention relates to new or improved compositions for the generation of smokes of vaporizable pest control compounds.

It is difficult to prepare compositions for the generation of smokes of vaporizable pest control compounds which are capable of rapidly and effectively vaporizing the pest control compound in a stream of gases of substantially neutral character at temperatures such that heat sensitive pest control compounds are not liable to be substantially wasted by thermal decomposition or which retain unvaporized pest control compound in the residue of the smoke composition to an undesirable extent, and which are also non-staining compositions yielding colorless and unobnoxious residues; and it is an object of the present invention to provide new and improved compositions for the generation of smokes of vaporizable pest control compounds.

I have found that especially desirable compositions for the generation of smokes of vaporizable pest control compounds, advantageously under conditions where a slight superatmospheric pressure is maintained, can be obtained when the vaporization is brought about in the composition by the self-supporting interaction between substantially stoichiometrically equivalent quantities of a nitrite of alkali metal of atomic weight not exceeding 40, and an ammonium salt of an inorganic acid.

According to the present invention a fumigating composition consists of a mixture comprising a thermally vaporizable pesticidal compound and substantially stoichiometrically equivalent quantities of a nitrite of an alkali metal of atomic weight not exceeding 40 and an ammonium salt of an inorganic acid in sufficient amounts to render the composition capable of propagating throughout itself at ordinary atmospheric pressure and particularly at slightly higher pressure an exothermic reaction when initiated by local heating.

The ammonium salt of the inorganic acid is preferably a non-deliquescent salt devoid of explosive properties for instance, ammonium chloride or ammonium sulphate, and the alkali metal nitrite is preferably sodium nitrite.

It is known that a mixture of stoichiometrically equivalent quantities of, for instance, sodium nitrite and ammonium chloride when freshly prepared and in a pulverulent condition will propagate its own decomposition through a previously unheated mass of the powdery material if only a small portion thereof is first heated to initiate the reaction. This reaction progresses quite slowly at atmospheric pressures without any appearance of flame or incandescence and with the evolution of volatile products consisting mainly of steam and nitrogen, at least approximately in accordance with the formulation $NaNO_2 + NH_4Cl = NaCl + 2H_2O + N_2$. Mixtures of the alkali metal nitrite and the ammonium salt of the inorganic acid alone are too unstable to be employed as such, and in putting the invention into effect there is employed a stabilizer which may be an anhydrous neutral salt adapted to combine water chemically with the formation of a hydrate, for instance, anhydrous sodium sulphate. Also suitable as stabilizers are anhydrous sodium carbonate, ammonium carbonate and certain anti-acid materials either of too faintly alkaline character or too low solubility readily to liberate ammonia from ammonium salts, or compounds capable of chemically combining with water to form alkaline earth bases; for instance, magnesium oxide, magnesium carbonate, magnesium basic carbonates, calcium oxide, calcium carbonate, zinc oxide, zinc carbonate. These compounds may be employed in amounts of about ½ to 2½% based on the combined weight of the alkali metal nitrite and the ammonium salt.

Preferably the pest control compound is mixed with a previously prepared pulverulent or granular composition consisting of the alkali metal nitrite, the ammonium salt of the inorganic acid and the stabilizer. In the case of a mixture of sodium nitrite and ammonium chloride in stoichiometrically equivalent proportions stabilized by the inclusion of 2% magnesium oxide the amount of solid pest control compound that can be incorporated without rendering the mixture incapable of propagating its decomposition when initiated at atmospheric pressure by local heating is usually about 20% to 30% of the weight of the whole mixture, but it is preferred to employ percentages ranging from 8 to 16. The rate at which the decomposition once initiated progresses through the mixture is greater at superatmospheric pressures than at atmospheric pressure. It is usually preferable to cause the mixture to decompose in a container having a somewhat restricted gas outlet area so that the prevailing pressure within the container during the reaction is slightly above atmospheric, for instance from 1.05 to 1.2 atmospheres. Under these conditions the impetus of emergence of the insecticidal fume is sufficient to create considerable turbulence in the atmosphere in the vicinity of the stream of fume, which assists it to interdiffuse rapidly with the air and thus assists in preventing the accumulation of unduly high concentrations of the pesticidal material in dead spaces, for instance in greenhouses and the like enclosures, which might result in damage to foliage and assists in the effective dispersal of the pesticide to all parts of the enclosure. Also under these conditions it is found that the gas stream carrying off the vapor of the pest control compound is unusually free from by-product nitrous gases, and the smoke shows a faintly alkaline reaction, and has a faintly ammoniacal odor as it is being evolved. The aqueous extract of the cold deposit collected in a closed space may however be slightly acid in some cases. The container is preferably capable of being sealed against the entry of moisture while the smoke composition is being stored in it.

The mixture may be used in loose pulverulent or small granular form, and its initiation may be brought about, for instance, by touching it with a red hot rod or by means of a fuse or by the application of a Vesuvian match, or a number of ordinary matches, to it. Alternatively initiation of its decomposition may be brought about by treating it locally with certain liquid acidic media and, especially when the composition contains a stabilizer capable of neutralization by acids, it is preferred that the acidic medium used should be one capable of providing a reservoir of material capable of neutralizing the stabilizer without rendering the pH of the mixture so low as to favor the liberation of nitrous acid from the sodium nitrite at the expense of the reaction between the alkali metal nitrite and the ammonium salt. Thus sulphuric acid of concentrations upwards of 50% by weight, acetic acid in concentrations ranging from 10 to 100%, phosphoric acid in concentrations ranging from 12 to 100%, or solutions of sodium dihydrogen phosphate or hydrated aluminium sulphate in concentrations ranging from 20% upwards may for instance be employed. In the case of weak acids such as acetic acid or phosphoric acid, the presence of buffer salts in the acid solution is advantageous.

As pest control compounds there may be employed for instance, nicotine, ortho-dichlorobenzene, hexa-ethyl-tetra-phosphate, diethyl para nitrophenyl thiophosphate, isobornyl thio-cyanoacetate, or dimethyl-phthalate or other vaporizable liquid pesticidal or pest repellant compounds. Preferably these are absorbed in a porous carrier, for instance, china clay, or kieselguhr and the so impregnated carrier is then mixed with stabilized mixture of the alkali metal nitrite and the ammonium salt of the inorganic acid. There may also be used solid vaporizable pest control compounds, for instance, naphthalene, azobenzene, pentachlorophenol, gamma - hexa-chlorocyclohexane or alpha-alpha-bis(parachlorophenyl) beta-beta-beta-trichlorethane.

The composition should be stored in air-tight containers. When the decomposition of the composition is initiated, it proceeds at a temperature well below red heat and the vaporization of the vaporizable pest control compound is assisted by the steam and nitrogen generated, which also serve to distribute it through the atmosphere, especially when the decomposition proceeds at a superatmospheric pressure.

The hot friable ash left at the end of the exothermic reaction after the fumigating compositions according to the invention have been initiated by local heating appears to assist in the efficient volatilization of the thermally vaporizable pesticidal compound.

The invention is illustrated by the following examples.

*Example I*

90 parts by weight of a mixture of sodium nitrite, ammonium chloride and magnesium oxide in the proportions 55:43:2 by weight in the form of a powder are mixed with 10 parts by weight of powdered alpha-alpha-bis(parachlorophenyl) beta-beta-beta-trichloroethane. The resulting loose powder is poured almost up to the top into tin-plate canisters each having a narrowly perforated inner lid and outer sealing lid capable of a good press fit so as to seal off the canister against the entry of moisture. A piece of igniter wick made of a fuse composition is embedded at one end in the loose powder and passes through the perforation into the space between the two lids. A coating of wax may be applied to ensure the maintenance of a good seal. On removing the outer lid and applying a match to the protruding end of the igniter wick, the latter burns down into the composition and initiates its decomposition, which thereupon supports itself and develops an internal pressure somewhat above atmospheric in the canister. Through the orifice in the inner lid there is forced a dense white fume smelling faintly of ammonia and turning red litmus paper blue, forming an aerosol of the above mentioned insecticidal compound which is effective in killing e. g. the tomato moth caterpillar (*Polia oleracea* L.), the white fly (*Trialeurodes vaporariorum* Westw.) and the flour weevil (*Tribolium castaneum* Hbst.). The reaction temperature is about 380° C. and the decomposition period during which the fume is evolved from each canister containing a 50 gm. charge is 95 seconds. An aqueous extract of the cold deposit from the fume is of faintly acid character, its acidity being 0.96% by weight calculated as nitric acid on the weight of the original charge of composition. The white ash consists mainly of sodium chloride and contains less than 0.1 part of the insecticidal compound. The aerosol deposits the insecticidal compound initially in the form of liquid droplets on the bounding surfaces of the apartment, and it is observed that the velocity of emergence of the fume is sufficient to cause its rapid admixture with the air in the apartment.

*Example II*

The mixture of 90 parts by weight of sodium nitrite, ammonium chloride and magnesium oxide as used in Example I is mixed with 10 parts by weight of a technically available preparation of gamma-hexachloro-cyclohexane containing 90% of the true gamma isomer. The composition is packaged and employed as described in Example I. The insecticidal fume is generated at a temperature of approximately 380° C. in 65 seconds for a 50 gm. charge. The insecticidal fume deposits a solid layer on the bounding surfaces of the apartment, lethal to for example white fly and flour weevil.

*Example III*

The composition consists of a mixture of 85 parts of the mixture of sodium nitrite, ammonium chloride and magnesium oxide, described in Example I with 15 parts of a commercial grade of hexachlorocyclohexane containing 13% of its weight of the true gamma isomer. A 50 gm. charge of the same weight packaged as in the previous examples decomposes at approximately 430° C. and takes 85 seconds to decompose. The fume results in a solid deposit lethal to black dock aphis (*Aphis rumicis*) and small cabbage white caterpillar (*Pieris rapae*).

*Example IV*

The composition consists of a mixture of 82 parts of the mixture of sodium nitrite, ammonium chloride and magnesium oxide, described in the previous examples, and 9 parts of kieselguhr impregnated with 9 parts of a commercial liquid insecticidal preparation containing 77% of diethyl polynitrophenyl-thio-phosphate. In this case the mixture is a little more difficult to ignite and three or four strands of the wick fuse have to be employed. Under the conditions described in the previous examples the reaction temperature is approximately 500° C. and the decomposition time for the 50 gm. charge is 110 seconds. The liquid film deposit is lethal to red spider and pea aphis (*Microsiphum pisi*).

*Example V*

A mixture of 86 parts by weight of sodium nitrite, ammonium chloride and magnesium oxide employed in the previous examples, with 7 parts of kieselguhr impregnated with 7 parts of isobornyl-thio-cyano-acetate is packaged in the manner described in the Examples I to IV except that a wad of woodpulp impregnated with potassium nitrate is used in conjunction with the wick fuse to assist the initiation of the decomposition. The decomposition occurs at approximately 400° C. and the generation of the fume from 50 gm. charge takes 110 seconds. The liquid film rapidly paralyzes house flies (*Musca domestica* L.) on walls and roofs.

*Example VI*

85 parts of the mixture of sodium nitrite, ammonium chloride and magnesium oxide used in the previous examples is mixed with 15 parts finely powdered azo-benzene and the charge is loaded into containers as described in the previous Examples I to IV. Each charge of 56 gms. takes about 90 seconds to decompose, yielding a yellowish-brown smoke which rapidly disperses and deposits the compound on the boundary surfaces of the apartment. The azo-benzene fume is lethal to the green-house red spider (*Tetranychus urtical* (Kosh)). The decomposition temperature is approximately 400° C. The amount of azo-benzene which is retained by the ash of the composition is only 0.1 part, out of the original 15 parts. The aqueous extract of the deposit has no alkalinity or acidity sufficient for measurement by ordinary volumetric analysis.

*Example VII*

90 parts by weight of the mixture of sodium nitrite, ammonium chloride and magnesium oxide as used in the previous examples, is mixed with 10 parts of the fungicidal compound pentachlorophenol and the mixture is charged into the containers as described in the previous examples. Each charge of 50 gms. takes 80 seconds to decompose, and the decomposition temperature is approximately 400° C. Petri dishes containing suitable media seeded with spores of the fungi *Penicillium digitatum* and *Furarium gremineorum* on exposure to the smoke from the above mixtures on incubation give no growth of the fungi.

I claim:

1. A fumigating composition capable of propagating throughout itself at ordinary atmospheric pressure and particularly at slightly higher pressure an exothermic reaction when initiated by local heating, said composition consisting of a mixture comprising from 7% to 30% by weight of a thermally vaporizable pesticidal compound and substantially stoichiometrically equivalent quantities of an alkali metal nitrite of an atomic weight up to and including 40 and a non-deliquescent, non-explosive ammonium salt of an inorganic acid, the heat of said reaction being insufficient to decompose the said pesticidal compound.

2. The fumigating composition as set forth in claim 1 wherein the ammonium salt of an inorganic acid is ammonium chloride.

3. The fumigating composition as set forth in claim 1 wherein the ammonium salt of an inorganic acid is ammonium sulphate.

4. The fumigating composition as set forth in claim 1 wherein the alkali metal nitrite is sodium nitrite.

5. A fumigating composition capable of propagating throughout itself at ordinary atmospheric pressure and particularly at slightly higher pressure an exothermic reaction when initiated by local heating, said composition consisting of a mixture comprising from 7% to 30% by weight of a thermally vaporizable pesticidal compound, the heat of said reaction being insufficient to decompose the said pesticidal compound, and substantially stoichiometrically equivalent quantities of an alkali metal nitrite of an atomic weight up to and including 40, a non-deliquescent, non-explosive ammonium salt of an inorganic acid, and a stabilizer for the alkali metal nitrite and the ammonium salt of the inorganic acid, said stabilizer being capable of chemically combining with water.

6. A fumigating composition as set forth in claim 5 wherein the stabilizer is selected from the group consisting of magnesium oxide, magnesium carbonate, a magnesium basic carbonate, calcium oxide, calcium carbonate, zinc oxide and zinc carbonate.

7. A fumigating composition as set forth in claim 6 wherein said stabilizer is magnesium oxide.

8. The fumigating composition as set forth in claim 5 wherein said stabilizer is in an amount of about ½ to 2½% based on the combined weight of the alkali metal nitrite and the ammonium salt.

DOUGLAS J. B. MARKE.

REFERENCES CITED

The following references are of record in the file of this patent:

UNITED STATES PATENTS

| Number | Name | Date |
| --- | --- | --- |
| 2,008,489 | Cousins | July 16, 1935 |
| 2,440,082 | Flanders et al. | Apr. 20, 1948 |